United States Patent [19]

Bell et al.

[11] 4,101,907
[45] Jul. 18, 1978

[54] OVERCOAT STRUCTURE FOR OPTICAL VIDEO DISC

[75] Inventors: Alan Edward Bell, East Windsor; Robert Alfred Bartolini, Trenton; Allen Bloom, East Windsor, all of N.J.

[73] Assignee: RCA Corporation, New York, N.Y.

[21] Appl. No.: 828,847

[22] Filed: Aug. 29, 1977

[51] Int. Cl.² .................... G01D 15/34; G01D 15/10
[52] U.S. Cl. ................................ 346/135; 346/76 L; 358/128
[58] Field of Search .............................. 346/135, 76 L

[56] References Cited

U.S. PATENT DOCUMENTS

| | | | |
|---|---|---|---|
| 3,560,994 | 2/1971 | Wolff et al. | 346/135 |
| 3,665,483 | 5/1972 | Becker et al. | 346/135 X |
| 3,740,761 | 6/1973 | Fechter | 346/135 |
| 3,889,272 | 6/1975 | Lou et al. | 346/135 X |
| 3,911,444 | 10/1975 | Lou et al. | 346/135 X |
| 3,971,874 | 7/1976 | Ohta et al. | 346/76 L X |
| 4,000,492 | 12/1976 | Willens | 346/135 X |
| 4,023,185 | 5/1977 | Bloom et al. | 346/135 |
| 4,069,487 | 1/1978 | Kasai et al. | 346/76 L |

*Primary Examiner*—George H. Miller, Jr.
*Attorney, Agent, or Firm*—H. Christoffersen; Birgit E. Morris

[57] ABSTRACT

An optical recording medium comprises a light reflecting material coated with a light absorbing material which is coated with a transparent barrier layer and overcoated with a relatively thick transparent protective layer. During recording, portions of the light absorbing layer are ablated by a modulated focussed light beam, thereby exposing portions of the reflecting layer while leaving the barrier and overcoat layers intact. Information is recorded in the form of a reflective-antireflective pattern. The overcoat layer suspends dust particles far above the focal plane of the recording lens, thereby reducing their effect on the recording or playback signal. The barrier layer insulates the light absorbing layer and the overcoat layer from chemical and thermal interactions which might result in a decreased signal-to-noise ratio.

10 Claims, 3 Drawing Figures

OVERCOAT STRUCTURE FOR OPTICAL VIDEO DISC

The Government has rights to this invention pursuant to Contract No. MDA904-76-C-0429 issued by the Department of the Army.

CROSS REFERENCE TO RELATED APPLICATION

This application is related to copending application "Thin Protective Overcoat Layer For Optical Video Disc", RCA Docket No. 71,516 by A. E. Bell, R. A. Bartolini, A. Bloom and W. J. Burke, filed concurrently herewith and incorporated herein by reference.

This invention relates to a novel optical recording medium. More particularly, this invention relates to an optical recording medium comprising a light reflecting material coated with a light absorbing layer which is coated with a thin, hard, inert, thermally insulating transparent layer and overcoated with a thick transparent layer.

BACKGROUND OF THE INVENTION

Spong, in a copending application entitled "Information Record and Related Recording and Playback Apparatus and Methods", Ser. No. 688,495, filed Mar. 19, 1976 and incorporated herein by reference, describes an ablative recording system whereby a focussed modulated light beam, such as a laser beam, is directed at an ablative recording medium. The recording medium comprises a light reflecting material coated with a light absorbing material on a substrate. The thickness of the light absorbing layer is chosen to reduce the reflectivity to a minimum value so that a maximum of light energy impinging on it is retained therein and is converted to thermal energy. This thermal energy causes the light absorbing material in the area struck by the light to ablate, thereby exposing selected portions of the light reflecting layer. During readout, the contrast between the light reflected from the absorbing layer, which is at the reflection minimum, and the light reflecting layer is detected.

Ongoing work in this area has resulted in the improved performance of the materials employed. Thus, in an illustrative embodiment of this recording medium, a substrate which is a flat, smooth, non-conductor of heat is coated with a thin layer of a light reflecting material, such as aluminum. The aluminum layer is passivated as described in a copending application entitled "Ablative Optical Recording Medium" by Bartolini et al, Ser. No. 668,504, filed Mar. 19, 1976. The passivated aluminum layer is in turn coated with a layer of an organic light absorbing material, such as 4-phenylazo-1-naphthylamine, as described in Bloom et al, "Ablative Optical Recording Medium", U.S. Pat. No. 4,023,185.

Alternatively, the light reflecting layer is coated with a transparent dielectric material, such as silicon dioxide. A thin layer of a metal is coated thereon to serve as the light absorbing layer. This configuration is described in the copending application of Bell entitled, "Information Record", Ser. No. 782,032, filed Mar. 28, 1977. Titanium is the metal most frequently used for this embodiment.

In order to eliminate or reduce signal defects or dropouts caused by surface dust which precipitates onto the medium from the environment, an overcoat from about 0.05 to 1 millimeter thick is applied to the light absorbing layer as described in a copending application entitled "Thick Protective Overcoat Layer For Optical Video Disc" by Bloom et al, Ser. No. 828,815 filed concurrently herewith and incorporated herein by reference. Dust particles and other surface contaminants which settle on the upper surface of the overcoat layer are so far removed from the focal plane of the recording lens that their effect on the recording or playback signal is considerably reduced, and no defects are noticeable on the playback monitor.

Silicone resin is a good overcoat material. However, the preferred silicone resin system uses a platinum catalyst to promote curing of the resin. Platinum can react with amines present in the light absorbing layer, thereby adversely affecting curing of the resin and attacking the surface of the light absorbing layer. This reaction, which increases the number of signal defects or dropouts, can be mitigated but not eliminated by baking or ageing the dye-coated disc before applying the silicone overcoat. In addition, organic dyes dissolve in most organic solvents, thereby limiting the number of materials suitable for use as overcoats.

When a metal light absorbing layer is used, it must have a low melting point to avoid damage to or optical distortion of the overcoat layer during recording. Thus, high-melting metals which form otherwise excellent light absorbing layers cannot be used effectively for recording through the overcoat layer. An improved recording medium would make it possible to protect the overcoat layer from thermal or chemical interaction with the light absorbing layer.

SUMMARY OF THE INVENTION

We have discovered an improved optical recording medium of a light reflecting layer coated with a light absorbing layer and overcoated with a relatively thick transparent layer, wherein a barrier layer of a certain thickness is situate between the light absorbing layer and the overcoat layer. The barrier layer insulates the light absorbing layer and the overcoat layer from chemical and thermal interactions which might result in a decreased signal-to-noise ratio of recorded information.

DETAILED DESCRIPTION OF THE INVENTION

Figure 1:
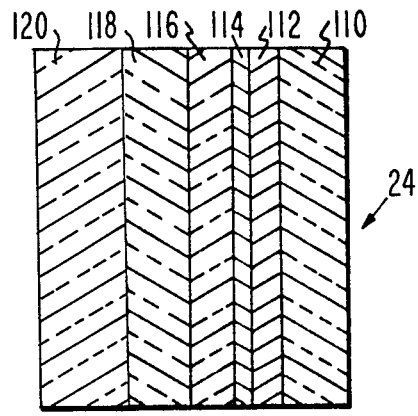
FIG. 1 is a cross-sectional view of a recording medium of the invention prior to recording.

The present invention is directed to a recording medium for use with a recording laser beam which provides light of a given frequency. The medium includes a layer of material which reflects light at the laser frequency coated with a layer of material which absorbs light at the laser frequency. The medium is overcoated with a relatively thick layer of material which suspends any surface dust particles out of focus of the recording laser beam. In order to insulate the light absorbing layer and the overcoat layer from chemical and thermal interactions, a barrier layer is coated on the light absorbing layer prior to application of the overcoat layer. If desired, the barrier and overcoat layers can be applied after recording, provided the light absorbing layer is kept clean.

The light reflecting material can be coated on a substrate with an optically smooth, flat surface to which the subsequently applied light reflective layer is adherent. A glass or plastic plate or disc is suitable. The reflecting layer should reflect light at the wavelength employed for recording. A gold layer about 800 angstroms thick forms a good, non-reactive reflecting layer. An aluminum layer from about 250 to 500 angstroms thick is also suitable. The aluminum layer can be oxidized to a depth of about 30 angstroms in order to passivate the surface.

The light absorbing layer must be absorbing at the wavelength used for recording. In addition it should form an amorphous, coherent film of a thickness that minimizes light reflection. Further, the light absorbing layer should be readily ablatable at low temperatures to form clearly defined, regularly shaped holes. A layer of 4-phenylazo-1-naphthylamine, obtained by evaporating the dyestuff Sudan Black B in a vacuum chamber, forms an excellent coating. Another good light absorbing layer is formed by coating the light reflecting layer with a layer of silicon dioxide which, in turn, is coated with a thin layer of titanium.

The overcoat layer should be transparent and non-scattering at the wavelength used for recording and readout. In addition it should be stable to ambient conditions. When the signal is recorded through the overcoat, the overcoat should allow formation of the signal elements beneath it and readout through it without substantially affecting picture quality. Silicone resins such as General Electric's RTV 615 and RTV 602 and Dow Corning's Sylgard 184 form suitable overcoat materials.

Preferably, materials for the barrier layer will be amorphous, optically transparent and non-scattering at the recording and readout wavelength. In addition they should be thermally insulating and chemically unreactive with respect to the light absorbing layer and the overcoat layer. It is desirable that materials for barrier layers be capable of application without chemically, physically or thermally disturbing the light absorbing layer. For example, when organic dyes are used for the light absorbing layer, since they are readily soluble in most organic solvents, a desired characteristic of a suitable barrier layer material is the capability of forming an amorphous layer by a non-solvent deposition process.

As with the overcoat material, the barrier layer should allow formation of the signal elements beneath it and readout through it without substantially affecting picture quality. Therefore, it is preferable that a barrier layer material have a sufficiently high melting point and hardness to resist rupture during readout. When a metal light absorbing layer is used, the signal-to-noise ratio of recorded information is increased about 5 decibels (dB) by choosing a barrier layer which does not soften when heated during recording.

Both organic and inorganic materials are suitable for use as barrier layers in the present invention. Inorganic dielectric materials have higher melting points and provide harder films than organic materials. These characteristics reduce the likelihood of rupture during recording and provide a barrier layer which can be used effectively with metal light absorbing layers having high melting points. In addition, inorganic materials are not attacked by most organic solvents which are used in applying certain overcoat materials. Therefore, they are somewhat more versatile materials for barrier layers than organic materials.

In a preferred embodiment, a silicon dioxide ($SiO_2$) barrier layer of an appropriate thickness is applied to a disc previously coated with light reflecting and light absorbing layers. Electron-beam deposition under high vacuum or reactive glow discharge from gaseous monomers such as silane are the preferred methods of forming the $SiO_2$ layer. There is no noticeable difference between $SiO_2$ layers formed using these two methods. Resistance heating yields $SiO_x$, where $x$ is any value between 1 and 2, which is somewhat less durable than $SiO_2$ but is also suitable.

Several organic materials also have been identified as suitable for use as barrier layers. Derivatives of sucrose in which the hydroxyl groups are replaced by ester groups, such as acetyloxy or benzoyloxy groups, form good barrier layers. In an illustrative embodiment, a layer of sucrose benzoate, formed from sucrose in which six or more hydroxyl groups have been replaced by benzoyloxy groups, is evaporated onto the organic dye light absorbing layer of the recording medium prior to application of the overcoat layer. Sucrose octaacetate also can be applied by evaporation to form a good barrier layer.

Another class of materials which form suitable barrier layers are pentaerythritol derivatives of rosin acids. These materials are low molecular weight (3,000 –7,000) thermoplastics which can be applied by evaporation. Pentaerythritol esters of partially or fully hydrogenated rosin acids, where the principle rosin acid component is abietic acid and the softening point is about 104° C., form good barrier layers.

Highly crosslinked films prepared in situ by glow discharge or by polymerization of a reactive monomer deposited on the surface are also good barrier layer materials. Suitable films include those prepared by exposing to glow discharge either a mixture of acetylene and nitrogen (1:3 ratio) or perfluoromethylcyclohexane in an argon carrier gas. Using the method described in U.S. Pat. No. 3,342,754, issued to Gorham and entitled "Para-xylylene Polymers", highly crosslinked polymeric conformal coatings can also be prepared having repeating units of the general formula:

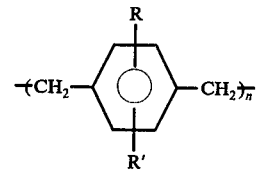

where $n$ indicates the number of repeating units in the polymer, and R and R' can be H or Cl.

The initial antireflection, light absorbing condition of the light absorbing layer can be preserved if the thickness of the barrier layer is carefully controlled. Optimally, the thickness of an optically passive, non-reflecting barrier layer will be equal to $m\lambda/2n$, where $m$ is an integer, $\lambda$ is the wavelength of the recording or readout light from the laser, and $n$ is the refractive index of the barrier layer material at the recording or readout wavelength. Thus, when using silicon dioxide as the barrier layer, with a refractive index of about 1.46 at a recording wavelength of 4880 angstroms from an argon laser, the optimum thickness is about 1670 angstroms when $m$ is 1 and 3440 angstroms when $m$ is 2.

The optimum thickness of the barrier layer is also determined by the thermal properties of the material used. This thickness should be such that the heat generated during recording does not diffuse through the barrier layer to the boundary of the overcoat layer during the time it takes to record an information pit. The thermal diffusion length, $l$, of a material is:

$$l = \sqrt{Kt}$$

where $K$ is the thermal diffusivity of the material and $t$ is the recording time. For silicon dioxide, K is $6 \times 10^{-3}$ centimeters squared per second. Using a time of 30 nanoseconds, during which a given area of the medium is exposed to the recording laser beam, the thermal diffusion length is about 1400 angstroms. Thus, the thickness of a silicon dioxide barrier layer should be greater than 1400 angstroms in order to form a thermal barrier. Although a barrier layer thickness of 1670 angstroms for silicon dioxide will preserve the optical passivity of the barrier layer and adequately prevent thermal damage to the overcoat layer, a thickness of 3440 angstroms would be preferred.

The invention will be further explained by reference to the drawings.

FIG. 1 shows a recording medium 24 of the invention prior to exposure to a recording light beam comprising a substrate 110, a light reflecting layer 112 with a transparent layer 114 thereon, a light absorbing layer 116, a barrier layer 118 and an overcoat layer 120.

Figure 2:
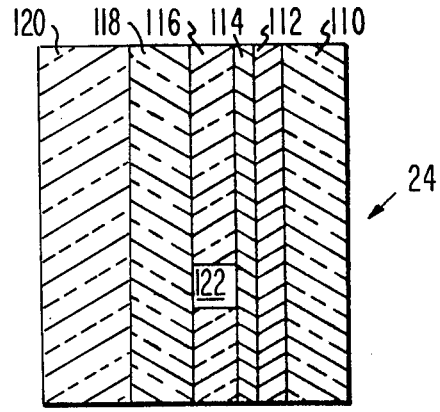
FIG. 2 is a cross-sectional view of a recording medium of the invention after recording.

FIG. 2 shows a recording medium of the invention after exposure to a recording light beam wherein the light absorbing layer 116 has been ablated to leave a pit 122, exposing the transparent passivating layer 114 to light while leaving the barrier layer 118 and the overcoat layer 120 intact. It will be understood that the recording medium after recording contains a plurality of pits 122 rather than the single one shown in FIG. 2.

Figure 3:
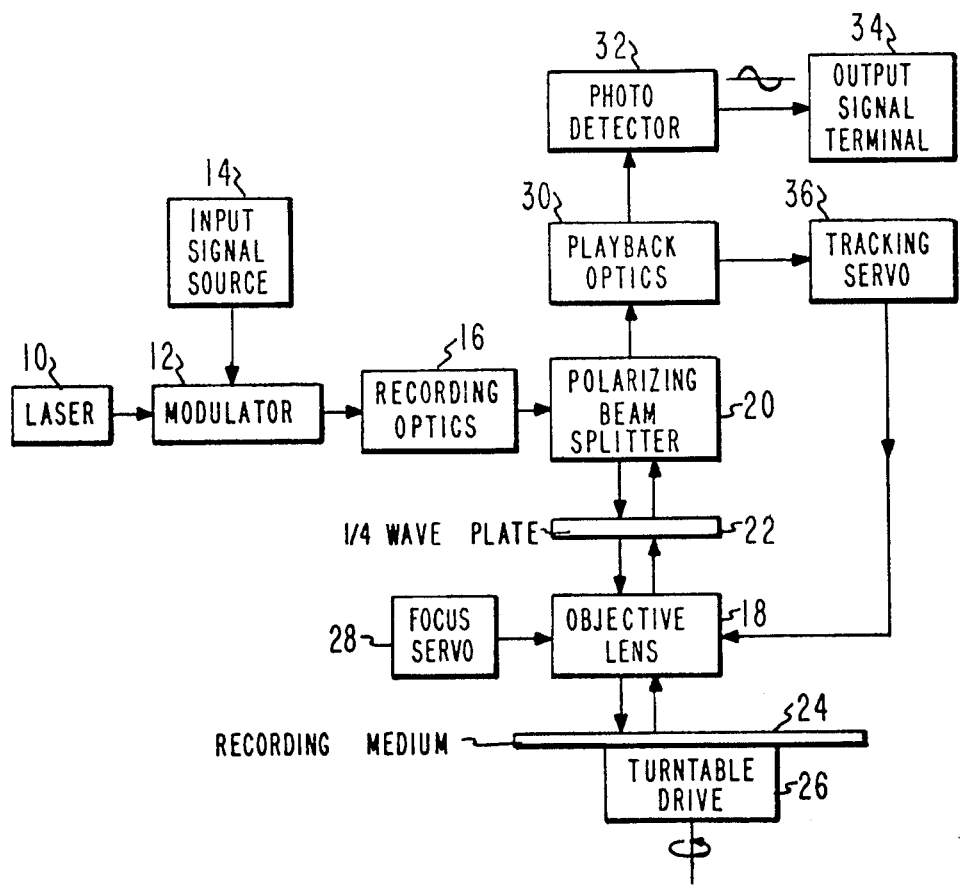
FIG. 3 is a schematic view of a system of recording and playback in which the present recording medium can be employed.

The use of the present recording medium can be explained in greater detail by referring to FIG. 3. For recording, the light emitted by a laser 10 is fed to a modulator 12 which modulates the light in response to an input electrical signal source 14. The modulated light is enlarged by recording optics 16 to increase the diameter of the intensity modulated laser beam so that it will fill the desired aperture of a cover glass corrected objective lens 18. The enlarged modulated laser beam is totally reflected by a polarizing beam splitter 20 and passes through a beam-rotating ¼ wave plate 22 to the objective lens 18. The modulated recording beam then impinges upon a recording medium 24 as described in FIG. 1 and ablates a portion of the light absorbing layer to expose a portion of the reflecting layer. The recording medium 24 is rotated by the turntable drive 26 at about 1800 rpm in a spiral track. A focus servo 28 maintains a constant distance between the cover glass corrected objective lens 18 and the surface of the recording medium 24.

For readout, an unmodulated and less intense laser beam, which will not cause ablation in the recording medium, follows the same path as the recording beam to the recording medium 24. The recorded reflection-antireflection pattern modulates the reflected light back through the objective lens 18 and the ¼ wave plate 22. The light, now rotated by 90° in polarization by the two passes through the ¼ wave plate 22, passes through the polarizing beam splitter 20 and is directed by playback optics 30 to a photodetector 32. The photodetector 32 converts the reflected light beam to an electrical output signal terminal 34 which corresponds to the input signal. A tracking servo 36 monitors the light through the playback optics 30 to ensure that the beam does not wander from the track during playback.

The present recording media can produce high quality recordings with signal-to-noise ratios in the range of about 44 – 46 decibels (dB) for the 4-phenylazo-1-naphthylamine dye light absorbing layer and about 49 – 52 dB for the titanium light absorbing layer.

Light induced thermal recording on the organic dye layer through the barrier and overcoat layers is possible without reducing the signal-to-noise ratio more than 6 dB. When a titanium light absorbing layer is covered with a silicon dioxide barrier layer and a silicone resin overcoat layer, the signal-to-noise ratio increases 8 – 9 dB. The above signal-to-noise ratios are within the range of broadcast standards. Recording media with lower signal-to-noise ratios are useful for consumer video disc or digitally encoded information records.

The invention will be further illustrated by the following examples, but the invention is not meant to be limited by the details described therein.

EXAMPLE 1

About 100 discs 12 inches (30.5 centimeters) in diameter were coated with light reflecting layers of gold about 800 angstroms thick or aluminum about 300 angstroms thick. The aluminum light reflecting layers were oxidized to a depth of about 30 angstroms in order to passivate the surface. The light reflecting layers were then coated with light absorbing layers of 4-phenylazo-1-naphthylamine about 400 angstroms thick on the gold layers and about 525 angstroms thick on the passivated aluminum layers. The 4-phenylazo-1-naphthylamine was formed by the evaporation and thermal decomposition of Sudan Black B dyestuff.

A representative sample of 20 of the resultant recording media was exposed to 50 nanosecond pulses of light having a wavelength of 4880 angstroms from an argon laser as in FIG. 3. The best recordings were obtained at a power setting of about 150 milliwatts from the laser and had signal-to-noise ratios in the range of about 46 – 52 dB.

Ten of the sample recording media tested above, were then baked at 50° C. overnight and spin coated with overcoat layers about 0.1 millimeter thick of General Electric's RVT 615, a room temperature vulcanizable silicone resin. This material is a highly crosslinked polymer formed by mixing a resin having the general formula:

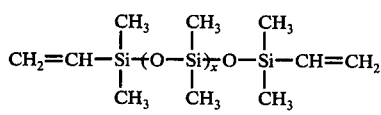

wherein $x$ is an integer, with a curing agent having the general formula:

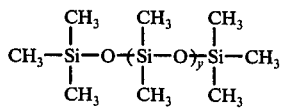

wherein $y$ is an integer and R can be H or $CH_3$ with the proviso that at least one R is H, in the presence of a platinum catalyst. The resin was cured by baking at 50° C. overnight.

Recording on the resultant recording media was carried out as described above with a laser power setting of about 300 milliwatts. The signal-to-noise ratios obtained were in the range of about 38 – 42 dB.

The remaining ten sample recording media were coated with silicon dioxide barrier layers about 1670 angstroms thick using either electron-beam deposition under high vacuum or reactive glow discharge from silane. The silicon dioxide layers were then overcoated with a 0.1 millimeter layer of the RTV 615 silicone resin and cured at 50° C. overnight.

Recording was carried out on the resultant recording media as described above with a laser power setting of about 300 milliwatts. The signal-to-noise ratios obtained were in the range of about 44 – 47 dB.

EXAMPLE 2

About 50 discs 12 inches (30.5 centimeters) in diameter were coated with a light reflecting layer of aluminum about 500 angstroms thick. The aluminum layers were coated with a layer of silicon dioxide about 800 angstroms thick. The silicon dioxide layers were then coated with a titanium layer about 75 angstroms thick.

Recording on a representative sample of 12 of the resulting recording media was carried out as described in Example 1. The laser power setting for the best recording was about 350 milliwatts, at which the signal-to-noise ratios were in the range of about 40 – 44 dB. At a power setting of about 300 milliwatts a signal-to-noise ratio of about 42 dB was obtained for a representative disc.

Two of the sample recording media were overcoated with General Electric's RTV 615 as described in Example 1. Recording was carried out on the resultant recording media as in Example 1. The laser power setting for the best recording was about 250 milliwatts at which a signal-to-noise ratio of about 39 was obtained. At a power setting of about 300 milliwatts the signal-to-noise ratio for the representative disc was about 38 dB.

The remaining ten sample recording media were coated with a layer of silicon dioxide about 1670 angstroms thick as in Example 1. The samples were then overcoated with the RTV 615 as in Example 1.

Recording was carried out on these recording media as described in Example 1. The laser power setting for the best recording was about 250 milliwatts, and the signal-to-noise ratios obtained were in the range of about 49 – 52 dB. At a power setting of about 300 milliwatts the signal-to-noise ratio for a representative sample disc was about 50 dB.

EXAMPLE 3

A disc about 12 inches (30.5 centimeters) in diameter was coated with a gold layer about 800 angstroms thick. The gold layer was coated with a layer of 4-phenylazo-1-naphthylamine dye about 400 angstroms thick as described in Example 1.

Recording on the resultant recording medium was carried out as described in Example 1. The laser power setting for the best recording was about 150 milliwatts at which a signal-to-noise ratio of about 44 dB was obtained. At a power setting of 250 milliwatts a signal-to-noise ratio of 43 dB was obtained.

A layer of sucrose benzoate (about 1630 angstroms thick) with about 75 percent or more of the —OH groups replaced by

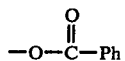

groups was then evaporated onto the dye layer of the recording medium. The sucrose benzoate layer was coated with a layer of General Electric's RTV 615 about 0.1 millimeters thick as described in Example 1.

Recording was carried out on the resultant recording medium as in Example 1. The laser power setting for the best recording was 250 milliwatts from the laser, at which a signal-to-noise ratio of about 41 dB was obtained.

We claim:

1. In a recording medium for use with a recording laser beam providing light of a given frequency, said recording medium having a light reflecting layer with a light absorbing layer thereon and an overcoat layer thereover, the improvement comprising a thermal and chemical barrier layer situate between the light absorbing layer and the overcoat layer,
    wherein the thickness of said barrier layer is a function of the wavelength of the light from said recording laser and of the refractive index of said barrier layer at said wavelength.

2. A recording medium according to claim 1 wherein the barrier layer is silicon dioxide.

3. A recording medium according to claim 1 wherein the barrier layer is a derivative of sucrose in which the hydroxyl groups of the sucrose are replaced by ester groups.

4. A recording medium according to claim 1 wherein a layer of dielectric material is situate between said light reflecting layer and said light absorbing layer.

5. In an information record for use with playback apparatus employing a playback light beam of a given frequency, said information record having a light reflecting layer with a light absorbing layer thereon, said light absorbing layer having therein a succession of spaced pits representative of recorded information, with an overcoat layer overlying said light absorbing layer, the improvement comprising a chemical and thermal barrier layer situate between the light absorbing layer and the overcoat layer,
    wherein the thickness of said barrier layer is a function of the wavelength of said playback light beam and of the refractive index of said barrier layer at said wavelength.

6. An information record according to claim 5 wherein said barrier layer is silicon dioxide.

7. An information record according to claim 5 wherein said barrier layer is a derivative of sucrose in which the hydroxyl groups of the sucrose are replaced by ester groups.

8. An information record according to claim 5 wherein said light reflecting layer is passivated aluminum, said light absorbing layer is 4-phenylazo-1-naphthylamine dye, said overcoat layer is a silicone resin, and said barrier layer is silicon dioxide.

9. An information record according to claim 5 wherein a layer of dielectric material is situate between said light absorbing layer and said light reflecting layer.

10. An information record according to claim 5 wherein said light reflecting layer is aluminum, said dielectric layer is silicon dioxide, said light absorbing layer is titanium, said overcoat layer is a silicone resin, and said barrier layer is silicon dioxide.

* * * * *